US012743175B2

(12) United States Patent
Liu et al.

(10) Patent No.: US 12,743,175 B2
(45) Date of Patent: Sep. 22, 2026

(54) CONTACTLESS BUTTON

(71) Applicant: DARWIN PRECISIONS CORPORATION, Hsinchu County (TW)

(72) Inventors: chih-hung Liu, Hsinchu County (TW); Ya Han Ko, Hsinchu County (TW); Ran-Shiou You, Hsinchu County (TW); Hsing-Yu Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 293 days.

(21) Appl. No.: 18/378,668

(22) Filed: Oct. 11, 2023

(65) Prior Publication Data

US 2024/0345686 A1 Oct. 17, 2024

(30) Foreign Application Priority Data

Apr. 14, 2023 (TW) ................................ 112113951

(51) Int. Cl.
*G06F 3/042* (2006.01)
*G02B 30/00* (2020.01)

(52) U.S. Cl.
CPC .......... *G06F 3/0421* (2013.01); *G02B 30/00* (2020.01)

(58) Field of Classification Search
CPC .............................. G06F 3/0421; G02B 30/00
USPC ....................................................... 250/338.1
See application file for complete search history.

(56) References Cited

U.S. PATENT DOCUMENTS

2020/0184246 A1* 6/2020 Fan .................... G06V 40/1318
2022/0335745 A1* 10/2022 Lai ........................ G06F 3/0436

FOREIGN PATENT DOCUMENTS

| | | | |
|---|---|---|---|
| CN | 216037994 | U | 3/2022 |
| JP | S51110466 | | 9/1976 |
| JP | H09160717 | A | 6/1997 |
| JP | H10106411 | A | 4/1998 |
| JP | 2015505624 | A | 2/2015 |
| TW | M616830 | U | 9/2021 |
| TW | I770949 | B | 7/2022 |
| TW | 202242936 | A | 11/2022 |

* cited by examiner

*Primary Examiner* — Carolyn Fin

(57) ABSTRACT

A contactless button includes a substrate, a frame body, a first light-emitting unit, an optical imaging assembly, and an optical switch assembly. The frame body is mounted on the substrate. The first light-emitting unit is in the frame body. The optical imaging assembly is in the frame body and covers the first light-emitting unit. The optical imaging assembly converts a first light beam provided by the first light-emitting unit into a three-dimensional optical image projected from the opening. The optical switch assembly includes a second light-emitting unit and an optical trigger switch. The optical trigger switch generates a manipulation signal when sensing a second light beam generated by the second light-emitting unit. One of the second light-emitting unit and the optical trigger switch is mounted on the substrate and in the frame body. The other one thereof is mounted on the frame body and next to the opening.

6 Claims, 5 Drawing Sheets

32(321)
6(62)
3
7
72
A1
A2
A3
2
6(61)
31
5

CONTACTLESS BUTTON

FIELD OF THE INVENTION

The present invention relates to a button, and particularly relates to a contactless button.

BACKGROUND OF THE INVENTION

Buttons are a kind of quite common input device at present. Control buttons can be seen from small electronic products to large implements. A contactless button is relatively sanitary as a control signal can be generated by a user who only needs to be close to the button rather than contacting the button.

The contactless button capable of displaying a three-dimensional image at present is primarily an infrared inductive button including an infrared sensor (IR Sensor). However, how to ensure that the infrared sensor is not easy to produce a misactuation with enough sensitivity becomes a great challenge.

SUMMARY OF THE INVENTION

The present invention provides a contactless button that features a simple structure and easy assembly and is capable of stably generating inductive signals with a certain sensitivity.

To obtain the above advantages, an embodiment of the present invention provides a contactless button, including a substrate, a frame body, a first light-emitting unit, an optical imaging assembly, and an optical switch assembly. The frame body is mounted on the substrate. A side of the frame body away from the substrate is provided with an opening. The first light-emitting unit is accommodated in the frame body. The optical imaging assembly is arranged in the frame body and covers the first light-emitting unit. The optical imaging assembly is adapted to convert a first light beam provided by the first light-emitting unit into a three-dimensional optical image projected from the opening. The optical switch assembly includes a second light-emitting unit and an optical trigger switch. The optical trigger switch is adapted to generate a manipulation signal when sensing a second light beam generated by the second light-emitting unit. One of the second light-emitting unit and the optical trigger switch is mounted on the substrate and located in the frame body and faces the opening. The other one thereof is mounted on the frame body and positioned next to the opening and faces the opening.

In an embodiment of the present invention, the frame body includes an arrangement groove. The arrangement groove is formed on a side of the opening. A notch of the arrangement groove is inclined to the operating direction and faces the opening. The optical trigger switch or the second light-emitting unit is arranged in the arrangement groove.

In an embodiment of the present invention, the contactless button further includes an optical diffusion unit mounted in the arrangement groove and located in the notch.

In an embodiment of the present invention, the optical imaging assembly includes an imaging unit and a lens array. The imaging unit faces the substrate and includes a preset pattern. The lens array is arranged on a side of the imaging unit away from the substrate. A first light beam passes through the imaging unit and the lens array to form the three-dimensional optical image.

In an embodiment of the present invention, the optical imaging assembly further includes a collimating unit, arranged between the substrate and the imaging unit and adapted to convert the first light beam into a collimating light beam.

In an embodiment of the present invention, a second light-emitting unit is an infrared light-emitting unit; and the optical trigger unit is an infrared sensor.

According to the above description, it is known that in the contactless button of the present invention, a second light-emitting unit and an optical trigger switch adapted to generate a sensing signal when sensing the second light beam generated by the second light-emitting unit are used, and one of the second light-emitting unit and the optical trigger switch is arranged on the substrate and the other one thereof is mounted on the frame body. Thus, the contactless button of the present invention features a simple structure and easy assembly. In addition, because the second light-emitting unit or the optical trigger switch arranged on the substrate faces the opening of the frame body with a larger range of action, the size of an overlapped region of the larger ranges of action of the second light-emitting unit and the optical trigger switch is increased with a certain sensitivity, so that the inductive signal can be stably generated.

Other objectives, features, and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
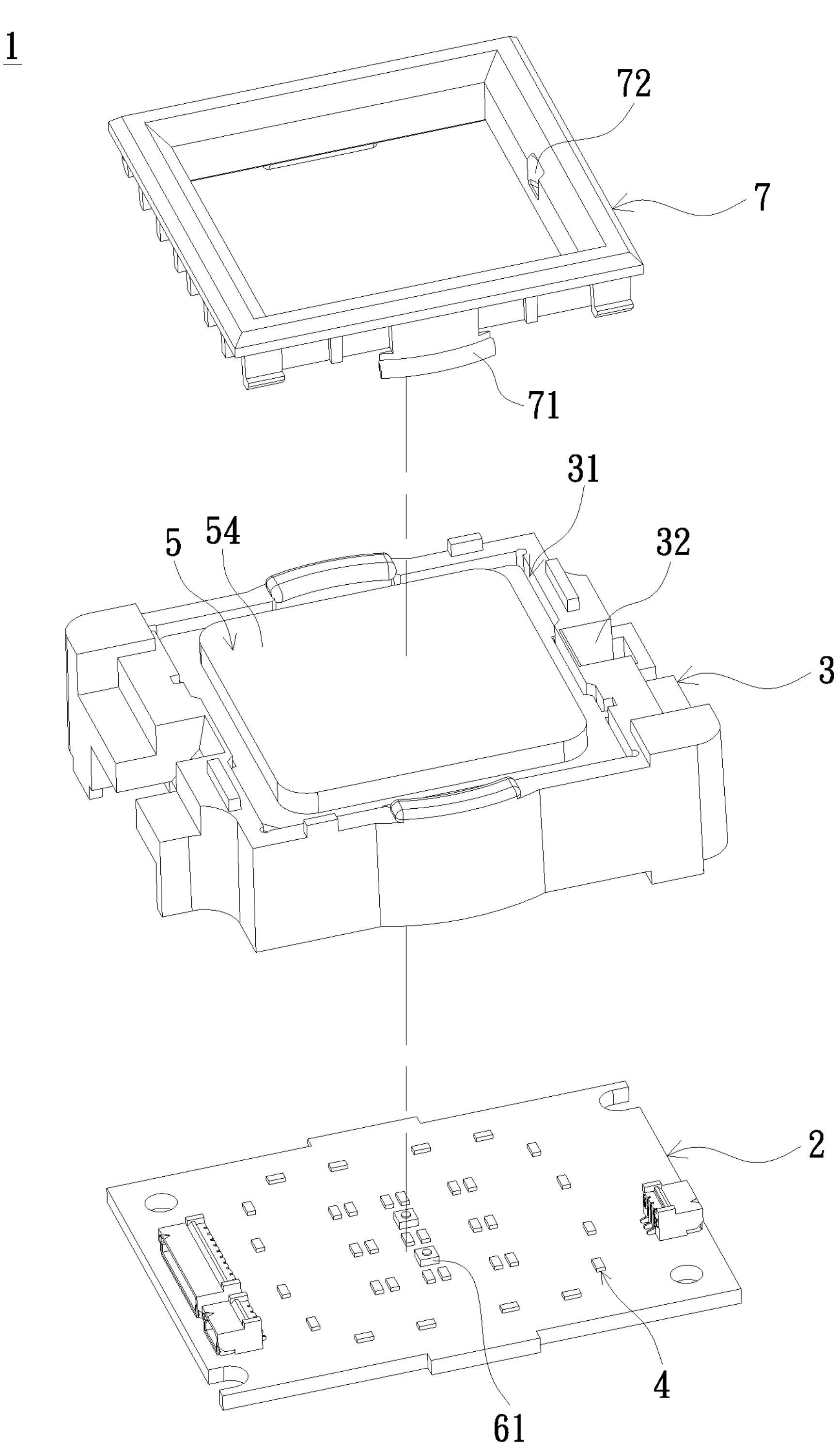
FIG. 1 is an exploded schematic diagram of a button in an embodiment of the present invention.

Terms used in the description of the embodiments of the present invention, for example, orientation or position relation such as “above” and “below” are described according to the orientation or position relation shown in the drawings. The above terms are used for facilitating the description of the present invention rather than limiting the present invention, i.e., indicating or implying that the mentioned elements have to have specific orientations and be configured in the specific orientations. In addition, terms such as “first” and “second” involved in the description or claims are merely used for naming the elements or distinguishing different embodiments or ranges rather than limiting the upper limit or lower limit of the quantity of the elements.

Figure 2:
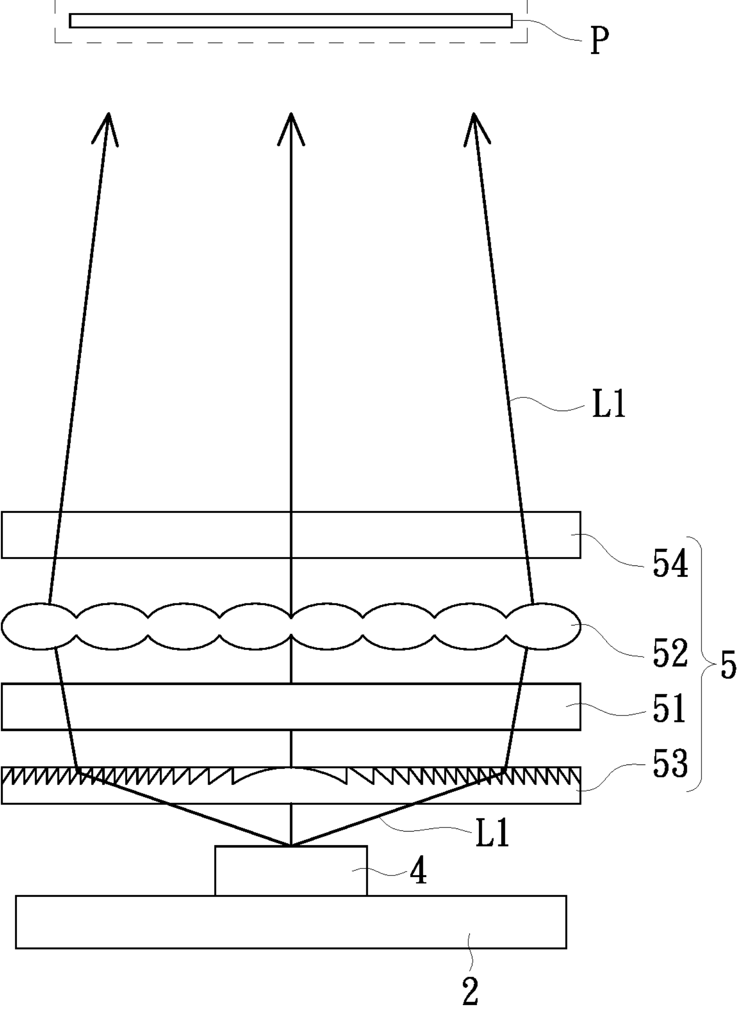
FIG. 2 is a schematic diagram illustrating an actuation of the optical imaging assembly to generate a three-dimensional optical image in FIG. 1.
Figure 3A:
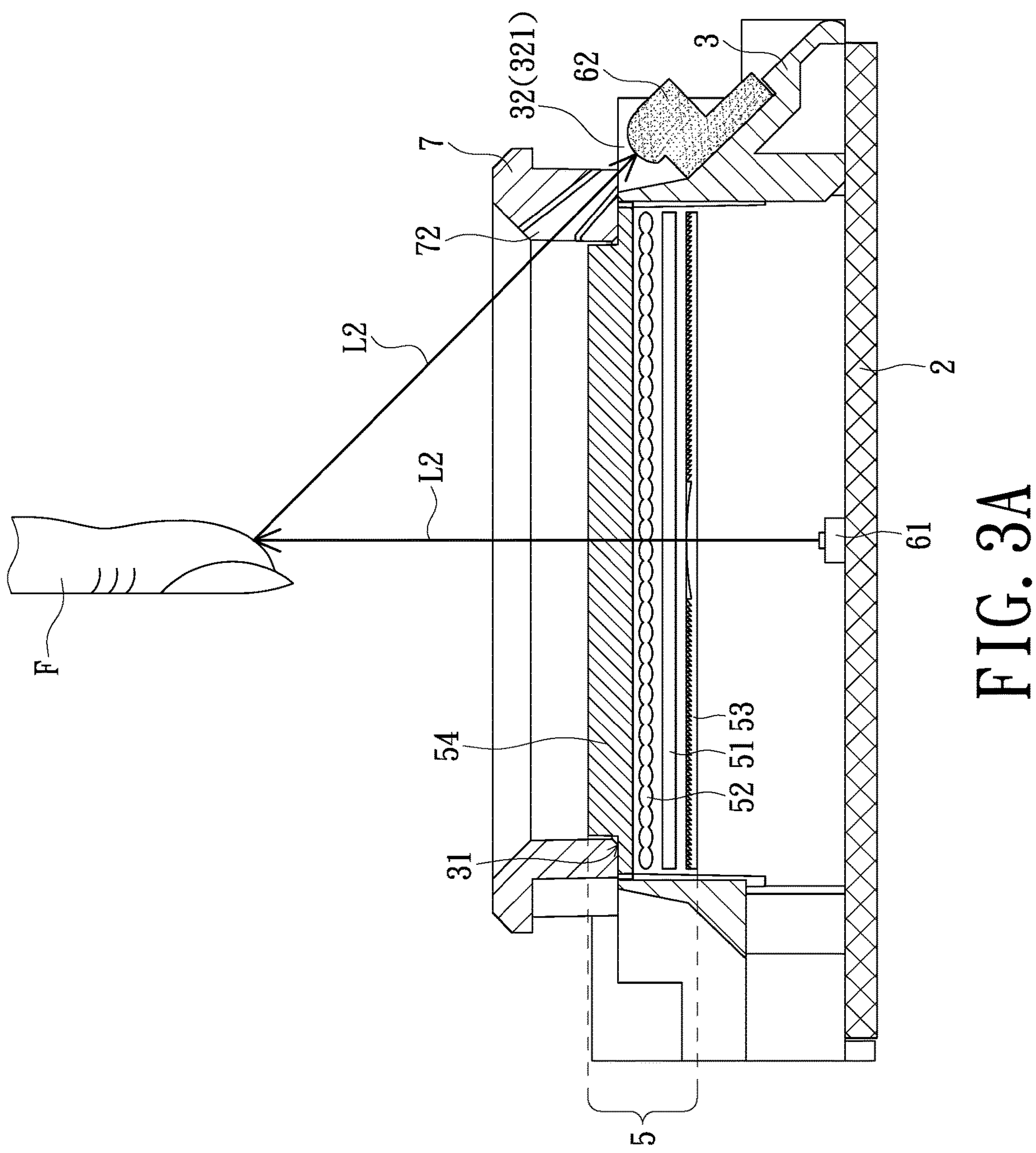
FIG. 3A is a schematic diagram illustrating an actuation of the optical switch assembly in FIG. 1.

FIG. 1 is an exploded schematic diagram of a button in an embodiment of the present invention. FIG. 2 is a schematic diagram illustrating an actuation of the optical imaging assembly to generate a three-dimensional optical image in FIG. 1. FIG. 3A is a schematic diagram illustrating an actuation of the optical switch assembly in FIG. 1. As shown in FIGS. 1 to 3A, a contactless button 1 provided in the embodiment of the present invention includes a substrate 2, a frame body 3, a first light-emitting unit 4, an optical imaging assembly 5, and an optical switch assembly 6. The frame body 3 is mounted on the substrate 2. A side of the frame body 3 away from the substrate 2 is provided with an opening 31. The first light-emitting unit 4 is accommodated in the frame body 3. The optical imaging assembly 5 is arranged in the frame body 3 and covers the first light-emitting unit 4. The optical imaging assembly 5 is adapted to convert a first light beam L1 provided by the first light-emitting unit 4 into a three-dimensional optical image P projected from the opening 31. The optical switch assembly 6 includes a second light-emitting unit 61 and an optical trigger switch 62. The optical trigger switch 62 is adapted to generate a manipulation signal (not shown in the figures) when sensing a second light beam L2 generated by the second light-emitting unit 61. One of the second light-emitting unit 61 and the optical trigger switch 62 is mounted on the substrate 2 and located in the frame body 3 and faces the opening 31; the other one thereof is mounted on the frame body 3 and positioned next to the opening 31 and faces the opening 31.

In this embodiment, the contactless button 1 is, for example, a button of an elevator, but the invention is not limited thereto. The manipulation signal is, for example, a signal for operating the elevator, which can be altered according to the device type set by the contactless button 1. The frame body 3 is, for example, rectangular, which can be altered according to the shape needed by the contactless button 1. The opening 31, for example, corresponds to the shape of the frame body 3. As shown in FIG. 1, the frame body 3, for example, includes an arrangement groove 32. The arrangement groove 32 is formed on a side of the opening 31, and a notch 321 of the arrangement groove 32 inclines to an operating direction so as to face the opening 31. The opening (not labeled) of the notch 321 is, for example, located in front of the optical imaging assembly 5. The optical trigger switch 62 or the second light-emitting unit 61 is arranged in the arrangement groove 32. As shown in FIG. 1, in this embodiment, there is, for example, one arrangement groove 32 formed at the edge of one side of the opening 31. The detailed positions and quantity of the arrangement grooves are not limited thereto and can be decided by the quantity of the optical trigger switch 62 or the second light-emitting unit 61.

As shown in FIG. 1 and FIG. 2, the contactless button 1, for example, further includes an outer frame 7. The outer frame 7 is, for example, connected to the frame body 3 through a tenon 71 and covers the opening 31. The shape of the outer frame 7, for example, corresponds to the shape of the frame body 3. The size of the opening 31 of the outer frame 7 is, for example, slightly smaller than that of the frame body 3, and the outer frame is adapted to prevent the optical imaging assembly 5 from being separated from the frame body 3 in the direction of the opening 31. The outer frame 7 is provided with a channel 72 corresponding to the position of the notch 321 of the arrangement groove 32. Therefore, the second light beam L2 can leave or enter the second light-emitting unit 61 or the optical trigger switch 62 arranged in the groove through the channel 72.

The first light-emitting unit 4 is, for example, a light-emitting diode (LED). The type and light-emitting color of the first light-emitting unit 4 are not limited and can be selected according to the demand of the vision and the optical imaging assembly 5. The optical imaging assembly 5 is, for example, configured to form the three-dimensional optical image P of a figure or a character, but the invention is not limited thereto. In the embodiment, the area of the optical imaging assembly 5, for example, corresponds to the area of the opening 31. During arrangement, the optical imaging assembly 5 is, for example, locked in the frame body 3, but the invention is not limited thereto.

As shown in FIG. 2, in this embodiment, the optical imaging assembly 5 includes an imaging unit 51 and a lens array 52. The imaging unit 51 faces the substrate 2 and includes a preset pattern (not shown in the figures). A default pattern corresponds to the shape of the three-dimensional optical image. In other words, the imaging unit 51 shields a part of the first light beam L1 from the first light-emitting unit 4 through the default pattern to decide the content of the three-dimensional optical image P. The lens array 52 is configured to be positioned on a side of the imaging unit 51 away from the substrate 2. The lens array 52 is, for example, either a single-sided convex lens array 52 or a lenticular lens array 52, which can be selected according to actual demand. By means of the above configuration, when the first light beam L1 passes through the imaging unit 51 and the lens array 52, the three-dimensional optical image P imaged in front (in front of the opening 31) of the contactless button 1 in visual effect can be formed.

As shown in FIG. 2, in this embodiment, the optical imaging assembly 5 further includes a collimating unit 53. The collimating unit 53, for example, is the Fresnel lens, but the invention is not limited thereto. The collimating unit 53 is arranged between the substrate 2 and the imaging unit 51 and adapted to convert a plurality of first light beams L1 from the first light-emitting unit 4 into collimating light beams substantially facing the opening 31, so as to enhance the light intensity of the finally generated three-dimensional optical image P.

In addition, as shown in FIG. 1 and FIG. 2, in this embodiment, the optical imaging assembly 5 further includes a pressing plate 54. The pressing plate 54 is, for example, a transparent acrylic sheet. As shown in FIG. 1, the pressing plate 54 covers the lens array 52 to prevent the lens array 52 from being scratched or polluted.

As shown in FIG. 1 and FIG. 3A, in the embodiment, the second light-emitting unit 61 of the optical switch assembly 6 is, for example, an LED. In detail, the second light-emitting unit is, for example, an infrared LED (IR LED) generating infrared rays, but the invention is not limited thereto. The second light-emitting unit 61 is, for example, mounted on the substrate 2 to project the second light beam L2 towards the front of the opening 31. The quantity of the second light-emitting unit 61 and the detailed positions thereof on the substrate 2 can be set according to the demand. In other embodiments where light emitted by the second light-emitting unit 61 is visible light, the second light-emitting unit 61 can also be used as a light source for light beams for generating the three-dimensional optical image P. The optical trigger switch 62 is, for example, arranged in the arrangement groove 32. In another embodiment (shown in FIG. 4), the optical trigger switch 62 can also be arranged on the substrate 2 with the need of correspondingly arranging the second light-emitting unit 61 in the arrangement groove 32. The optical trigger switch 62 is, for example, the infrared sensor, which can be altered according to the wavelength of the second light beam L2. Under the condition that the wavelength of the second light beam L2 does not exist naturally in an environment of the contactless button 1, misactuation of the optical trigger switch 62 generated by environmental influence can be reduced.

As shown in FIG. 3A, when a finger F of a user approaches the contactless button 1, the second light beam L2 generated by the second light-emitting unit 61, for example, passes through the optical imaging assembly 5 first, then irradiates the finger F of the user, and then is reflected by the surface of the finger F to enter the optical trigger switch 62.

In addition, because the optical imaging assembly 5 is a bidirectional transmittable component, in the embodiment where the optical trigger switch 62 is mounted on the substrate 2 (shown in FIG. 4), the second light beam L2 generated by the second light-emitting unit 61 can also be sensed by the optical trigger switch 62 by passing through the optical imaging assembly 5 through reflection without forming an extra perforated hole in the optical imaging assembly 5, but the invention is not limited thereto.

Because not both the second light-emitting unit 61 and the optical trigger switch 62 are arranged on the substrate 2, the contactless button 1 in this embodiment can prevent the second light beam L2 generated by the second light-emitting unit 61 from being reflected by the optical imaging assembly 5 to the optical trigger switch 62 to generate misactuation.

Figure 3B:
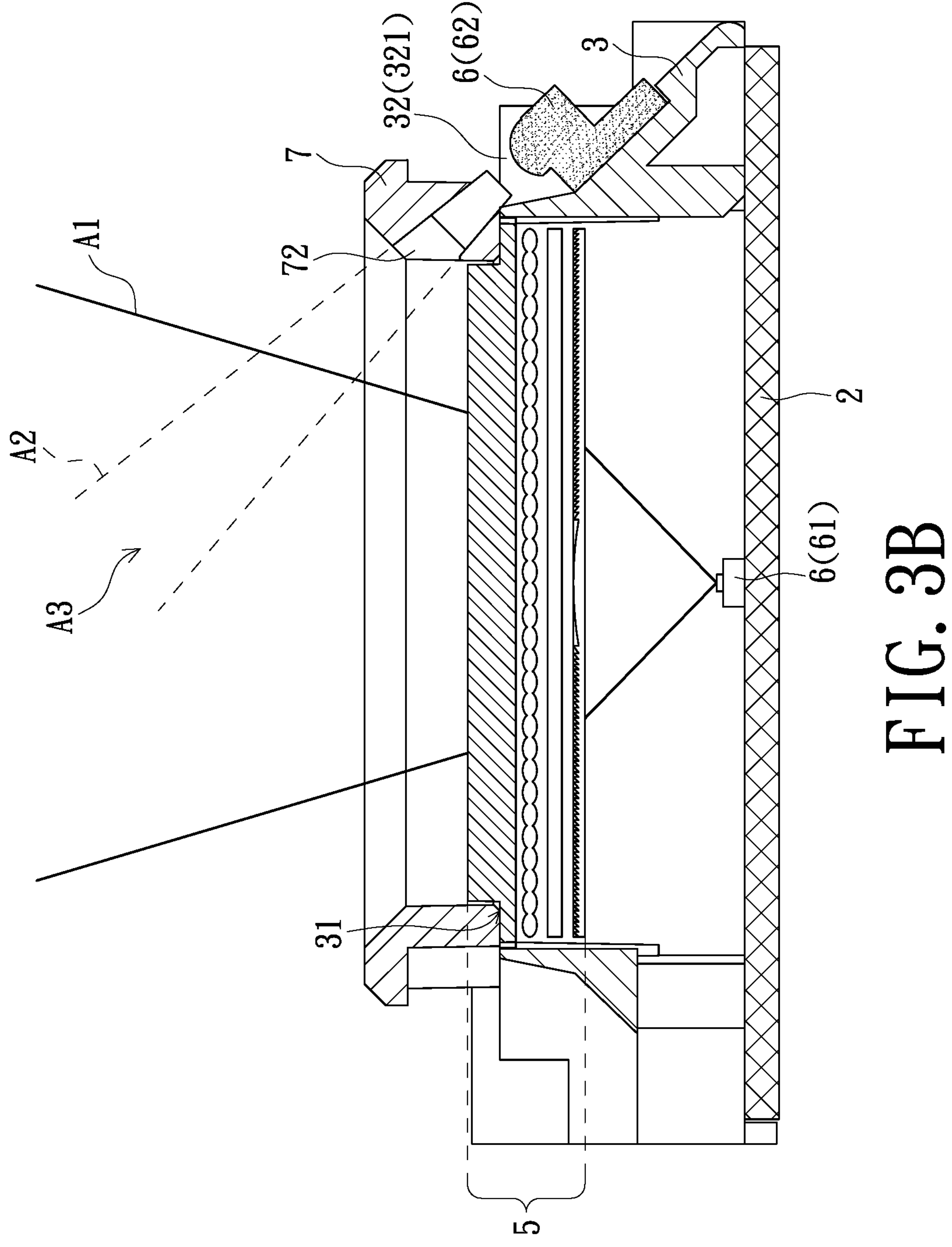
FIG. 3B is a schematic diagram of a sensing range of the actuating optical switch assembly in FIG. 1.

FIG. 3B is a schematic diagram of a sensing range of the actuating optical switch assembly in FIG. 1. As shown in FIG. 3B, FIG. 3B respectively illustrates a range of action A1 (the range where the second light beam L2 can be projected) of the second light-emitting unit 61, a range of action A2 (the range where the second light beam L2 can be sensed) of the optical trigger switch 62, and a range of action A3 where the second light beam L2 can be received by the optical trigger switch 62 after being reflected by the finger F. It can be known from FIG. 3B that the range of action A3 is decided by an overlapped part of the range of action A1 and the range of action A2. In this embodiment, because the range of action A1 is larger than the range of action A2, the inductive sensitivity of the contactless button 1 is mainly decided according to the size of the range of action A2 which is smaller.

It can be known from FIG. 3B, through the aforementioned configuration, because the components arranged on the substrate 2 will not be limited by the size of the opening 31, they have the larger range of action A1 or range of action A2. For example, in the embodiment where the component on the substrate 2 is the second light-emitting unit 61, it has a large projection area. In the embodiment where the component on the substrate 2 is the optical trigger switch 62, it has a large inductive area. In the embodiment, because not both the second light-emitting unit 61 and the optical trigger switch 62 are arranged on one side of the opening 31 (for example, the second light-emitting unit 61 and the optical trigger switch 62 are respectively arranged on the left and right sides of the opening 31), the contactless button 1 in the embodiment is capable of having higher inductive stability.

In addition, as shown in FIG. 3B, as the frame body 3 itself needs a certain height to accommodate necessary assemblies such as the first light-emitting unit 4 and the optical imaging assembly 5, the optical trigger switch 62 is closer to the three-dimensional optical image P (not shown in the figures) when the optical trigger switch 62 is mounted on the frame body 3. In other words, the optical trigger switch is closer to a reflection part where the second light beam L2 is reflected, so that the contactless button 1 has better inductive sensitivity. Viewed from this angle, in the embodiment where the second light-emitting unit 61 is arranged in the arrangement groove 32 (for example, the embodiment shown in FIG. 4), because the finger F (the reflection part) is closer to the second light-emitting unit 61, the intensity of the second light beam L2 reflected can become higher without adding the second light-emitting unit 61, so that the contactless button 1 also has better inductive sensitivity.

Furthermore, similar to the description of the optical imaging assembly 5 above, the second light beam L2 generated by the second light-emitting unit 61 in the embodiment is, for example, converted into the collimating light beam substantially facing the front of the opening 31 first through the collimating unit 53 and is then projected in front of the opening 31. In other words, in addition to enhancing the light intensity of the three-dimensional optical image P, the collimating unit 53 further can enhance the intensity of light projected in front of the opening 31 by the second light-emitting unit 61 in the embodiment where the second light-emitting unit 61 is arranged on the substrate 2, so as to enhance the intensity of the second light beam L2 reflected by the finger F of the user during use, thereby improving the inductive accuracy of the contactless button 1.

In addition, compared with the mode where both the second light-emitting unit 61 and the optical trigger switch 62 are arranged next to the opening 31 and are located on the two opposite sides of the opening 31, the mode where the second light-emitting unit 61 is mounted on the substrate 2 to project towards the front of the opening 31 further can prevent the finger F of the user from shielding the second light beam L2 when the finger F of the user is too close to the contactless button 1 so as to further prevent the probability that the part induced by the optical trigger switch 62 is just located at a lucifugous shadow spot of the finger F, thereby further improving the inductive accuracy of the contactless button 1.

Figure 4:
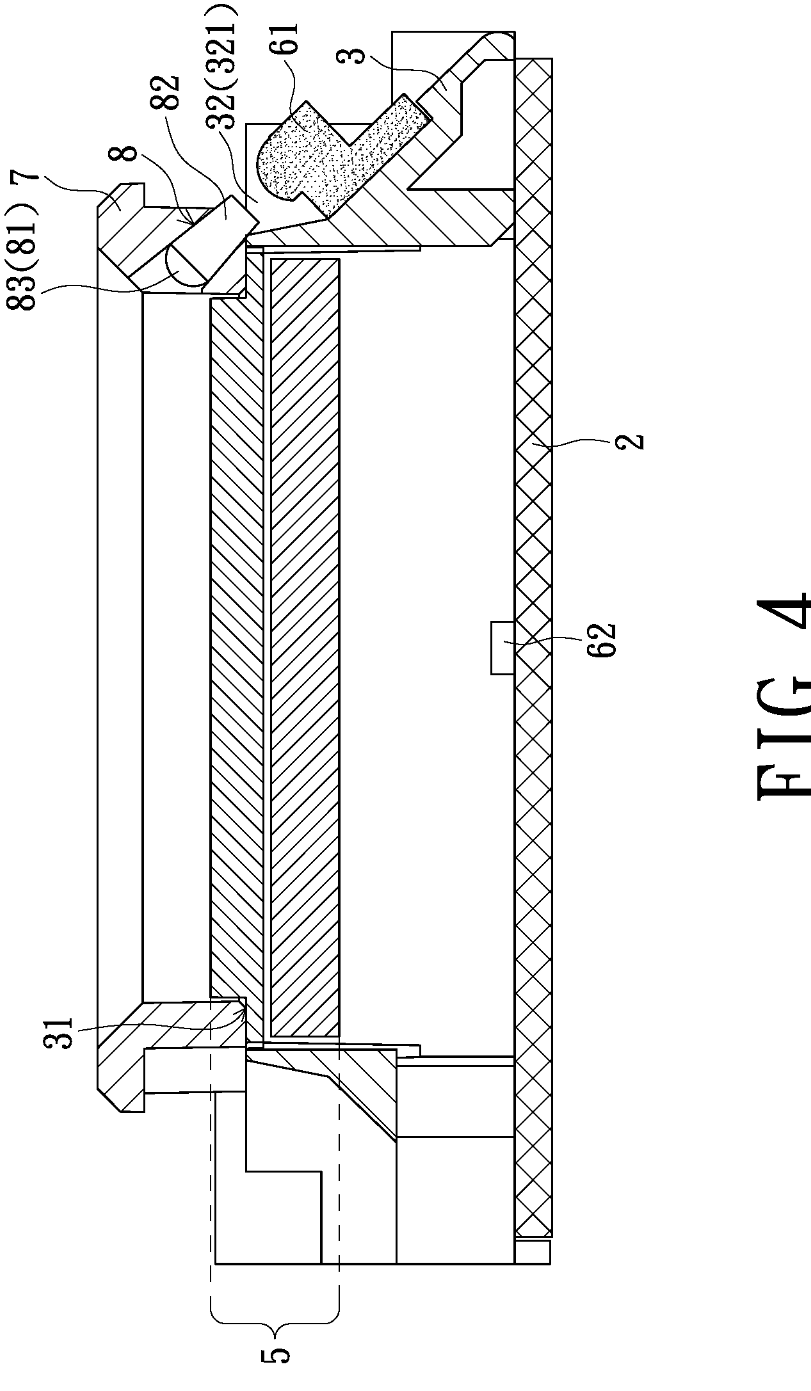
FIG. 4 is a schematic diagram of the sensing range of the actuating optical switch assembly in an embodiment of the present invention.

FIG. 4 is a schematic diagram of the sensing range of the actuating optical switch assembly in an embodiment of the present invention. In the embodiment shown in FIG. 4, the optical trigger switch 62 is, for example, arranged on the substrate 2, and the second light-emitting unit 61 is, for example, arranged in the arrangement groove 32. The contactless button 1 further includes an optical diffusion unit 8. The optical diffusion unit 8 is, for example, mounted in the arrangement groove 32 and is located in the notch 321 of the arrangement groove 32.

The optical diffusion unit 8 is, for example, a transparent acrylic block and is provided with a first end 81 and a second end 82. The first end 81 is close to the opening 31 and the second end 82 is close to the second light-emitting unit 61. An arc-shaped convex surface 83 is, for example, formed at the first end 81. Therefore, the second light beam L2 generated by the second light-emitting unit 61 can be diffused to a larger range through the optical diffusion unit 8 to prevent the diffusion range of the second light beam L2 from being limited by the size of the opening 31 of the arrangement groove 32. A matte surface for diffusing the light beam is, for example, formed at the first end 81 of the optical diffusion unit 8. The present invention has no limitation to the specific structure of the optical diffusion unit 8.

According to the above description, it is known that in the contactless button of the present invention, a second light-emitting unit and an optical trigger switch adapted to generate a sensing signal when sensing the second light beam generated by the second light-emitting unit are used, and one of the second light-emitting unit and the optical trigger switch is arranged on the substrate and the other one thereof is mounted on the frame body. Thus, the contactless button of the present invention features a simple structure and easy assembly. In addition, because the second light-emitting unit or the optical trigger switch arranged on the substrate faces the opening of the frame body with a larger range of action, the size of an overlapped region of the larger ranges of action of the second light-emitting unit and the optical trigger switch is increased with a certain sensitivity, so that the inductive signal can be stably generated.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A contactless button, comprising:

a substrate;

a frame body, mounted on the substrate, wherein a side of the frame body away from the substrate is provided with an opening;

a first light-emitting unit, accommodated in the frame body;

an optical imaging assembly, arranged in the frame body and covering the first light-emitting unit, wherein the optical imaging assembly is adapted to convert a first light beam provided by the first light-emitting unit into a three-dimensional optical image projected from the opening; and an optical switch assembly, comprising a second light-emitting unit and an optical trigger switch, wherein the optical trigger switch is adapted to generate a manipulation signal when sensing a second light beam generated by the second light-emitting unit, the second light-emitting unit is mounted on the substrate and located in the frame body and faces the opening, and the optical trigger switch is mounted on the frame body and positioned next to the opening and faces the opening;

wherein the optical imaging assembly further comprises a collimating unit, and the second light beam generated by the second light-emitting unit passes through the collimating unit.

2. The contactless button according to claim 1, wherein the frame body comprises an arrangement groove, the arrangement groove is formed in a side of the opening, a notch of the arrangement groove is inclined to an operating direction and faces the opening, and the optical trigger switch or the second light-emitting unit is arranged in the arrangement groove.

3. The contactless button according to claim 2, further comprising an optical diffusion unit mounted in the arrangement groove and located in the notch.

4. The contactless button according to claim 1, wherein the optical imaging assembly comprises:

an imaging unit, facing the substrate and comprising a preset pattern; and a lens array, arranged on a side of the imaging unit away from the substrate, wherein the first light beam passes through the imaging unit and the lens array to form the three-dimensional optical image.

5. The contactless button according to claim 4, wherein the collimating unit is arranged between the substrate and the imaging unit and adapted to convert the first light beam into a collimating light beam.

6. The contactless button according to claim 1, wherein the second light-emitting unit is an infrared light-emitting unit; and the optical trigger switch is an infrared sensor.

* * * * *